United States Patent
Montero et al.

(10) Patent No.: US 12,306,729 B2
(45) Date of Patent: May 20, 2025

(54) EMBEDDED CONTROLLER TO SAVE SYSTEM TELEMETRY DATA DURING SYSTEM FAILURES

(71) Applicant: DELL PRODUCTS L.P., Round Rock, TX (US)

(72) Inventors: Adolfo S. Montero, Pflugerville, TX (US); Ibrahim Sayyed, Georgetown, TX (US); Karunakar Poosapalli, Bangalore (IN)

(73) Assignee: Dell Products L.P., Round Rock, TX (US)

(*) Notice: Subject to any disclaimer, the term of this patent is extended or adjusted under 35 U.S.C. 154(b) by 91 days.

(21) Appl. No.: 18/458,518

(22) Filed: Aug. 30, 2023

(65) Prior Publication Data

US 2025/0068530 A1 Feb. 27, 2025

(51) Int. Cl.
*G06F 11/00* (2006.01)
*G06F 9/4401* (2018.01)
*G06F 11/22* (2006.01)

(52) U.S. Cl.
CPC ........ *G06F 11/2284* (2013.01); *G06F 9/4406* (2013.01)

(58) Field of Classification Search
CPC ............................ G06F 11/2284; G06F 9/4406
USPC ........................................................ 714/30
See application file for complete search history.

(56) References Cited

U.S. PATENT DOCUMENTS

| 11,416,327 B2 | 8/2022 | Sayyed et al. |
| 11,650,887 B2 | 5/2023 | Samuel et al. |
| 2015/0378844 A1* | 12/2015 | Zhang ................. G06F 11/1464 714/19 |

* cited by examiner

*Primary Examiner* — Jason B Bryan
(74) *Attorney, Agent, or Firm* — Larson Newman, LLP

(57) ABSTRACT

An information handling system includes first and second storages, a basic input/output system (BIOS), and an embedded controller. The first storage stores telemetry data associated with the information handling system. The second storage includes a boot partition. The BIOS stores the telemetry data in the first storage. The embedded controller receives the telemetry data stored in the first storage from the BIOS. The embedded controller provides the telemetry data to the boot partition of the second storage over an out-of-band communication channel.

20 Claims, 4 Drawing Sheets

EMBEDDED CONTROLLER TO SAVE SYSTEM TELEMETRY DATA DURING SYSTEM FAILURES

FIELD OF THE DISCLOSURE

The present disclosure generally relates to information handling systems, and more particularly relates to an embedded controller to save system telemetry data during system failures.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes first and second storages, a basic input/output system (BIOS), and an embedded controller. The first storage may store telemetry data associated with the information handling system. The second storage includes a boot partition. The BIOS may store the telemetry data in the first storage. The embedded controller may receive the telemetry data stored in the first storage from the BIOS. The embedded controller may provide the telemetry data to the boot partition of the second storage over an out-of-band communication channel.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
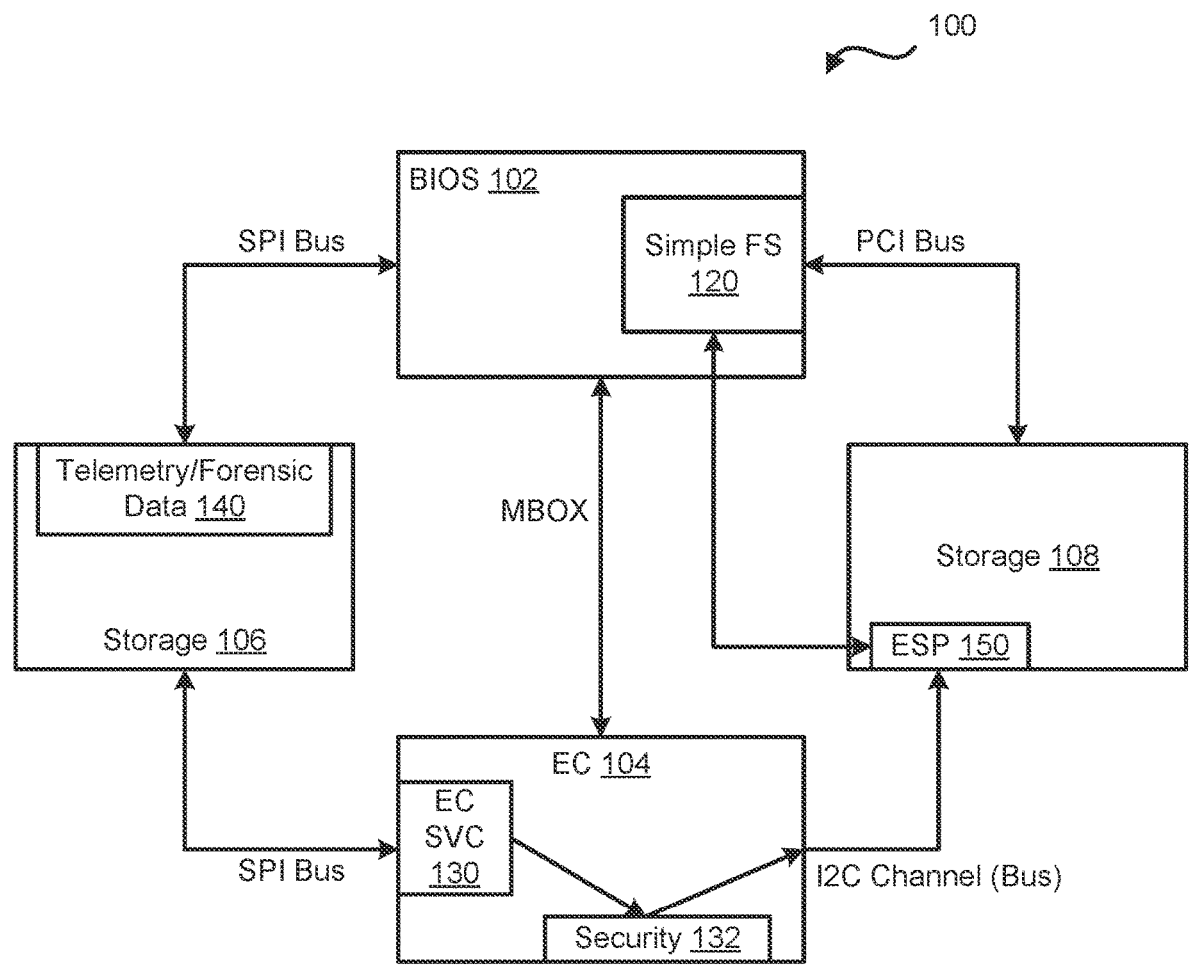
FIG. 1 is a block diagram of a portion of an information handling system according to at least one embodiment of the present disclosure.

FIG. 1 illustrates a portion of an information handling system 100 according to at least one embodiment of the present disclosure. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (such as a desktop or laptop), tablet computer, mobile device (such as a personal digital assistant (PDA) or smart phone), server (such as a blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Information handling system 100 includes a basic input/output system (BIOS) 102, an embedded controller (EC) 104, and storages 106 and 108. Storage 106 may be any suitable type of memory, such as a serial peripheral interface (SPI) non-volatile random-access memory (NRVAM). In an example, storage 108 may be any suitable type of memory including, but not limited to, non-volatile memory express (NVMe). BIOS 102 includes a simple file system (FS) 120, an EC service (SVC) 130 and a security module 132. Storage 106 may store any suitable data including, but not limited to, telemetry/forensic data 140. Storage 108 may be divided into multiple partitions including boot partition (ESP) 150. Information handling system 100 may include any suitable number of additional components or information handling systems without varying from the scope of this disclosure.

During operation of information handling system 100, BIOS 102 may collect telemetry data 140, such as critical instrumentation and usage data from BIOS and firmware value-add features. In an example, telemetry data 140 may be associated with system failures such as NoPost-NoVideo (NP-NV), boot failures, host operating system (OS) asserted blues screen of death (BSOD) crashes, and other general device failures. In certain examples, telemetry data 140 may provide important key debug data points and insights to expedite the root cause analysis (RCA) process and shorten the time to reach a proactive remediation to the issue associated with information handling system 100.

In an example, storage 106 may have limited space and may only host around 80-90 events. If telemetry data 140 is not collected from the OS agent or a SPI region in storage 106 is full, no new telemetry data 140 will be tracked and logged in the storage. In certain examples, telemetry data 140 may be tracked by BIOS 102, but the BIOS may not have write access to storage 106. In these situations, telemetry data 140 may be transported from a pre-EFI initialization (PEI) phase of BIOS 102 to a driver execution environment (DXE) phase of the BIOS and saved by a DXE driver. However, when a boot situation arises due to DXE image/driver issues, telemetry data 140 may not be logged in the NVRAM space of storage 106.

In certain examples, a full SPI ROM erase cycle may completely wipe out telemetry data 140 in the current serviceability process of wiping out storage 106, such as a SPI flash, to restore a system as first attempt to fix a NP-NV issue. In an example, when information handling system 100 boots normally, telemetry data 140 may be offloaded onto ESP partition 150 of storage 108. However, in a NP-NV condition, previous information handling system may not have mechanisms to offload the telemetry data into the ESP partition due to the technical limitation of NVMe I/O not being enabled. Previous information handling systems do not currently have an out-of-band mechanism to save the telemetry data during these critical system failure conditions. In previous information handling systems, the BIOS does have normal primary I/O access to a NVMe ESP partition when a system is able to compete POST normally.

Information handling system 100 may be improved by EC 104 accessing ESP region 150 via EC sideband I2C channel when BIOS 102 is not bootable. This improvement to information handling system 102 may be created by EC utilizing the I2C channel/bus to access storage 108 as a way to save telemetry data 140 or other critical data into ESP partition 150 at times when normal NVMe I/O is not practical. Information handling system 100 may also be improved by saving data that must be protected against SPI Flash erase events in storage 106 and storing the data into dedicated EC access region for times when BIOS 102 may no longer access storage 108 via primary I/O over a PCI bus due to risk of contention with the OS of the information handling system. Information handling system 100 may also be improved by security module or hardware cryptography engine 132 encrypting telemetry data 140 or other BIOS data before storing the data in ESP partition 150 of storage 108.

In an example, EC 104 may be utilized as an out-of-band (OOB) controller to intelligently manage and preserve the telemetry critical data by using a NVMe I2C sideband channel to save telemetry data 140 to ESP partition 150 of storage 108. The utilization of EC 104 as an OOB controller may provide access to storage 108, which may be generally protected from user access, such as during OS re-imaging operations. In certain examples, I2C channel may be an I3C channel without varying from the scope of this disclosure.

If during a boot operation of information handling system, a NP-NV system state is identified, EC 104 may be utilized as a sideband access path to transfer telemetry data 140 from the SBIOS progress buffer to boot partition 150 of storage 108. In an example, EC 104 and SBIOS PEI layer of BIOS 102 may coordinate telemetry data 140 transfer operation via any suitable manner. For example, BIOS 102 may communicate telemetry data 140 to EC 104 via the legacy MBOX I/O path. In response to receiving telemetry data 140 from BIOS 102, EC 104 may provide and store the telemetry data in ECP 150 of storage 108. In an example, EC 104 may utilize the NVMe sideband I2C channel to store the telemetry logs into NVMe boot partition space (ESP) 150.

In an example, storage 106, such as a SPI ROM, may be full such that no more telemetry data 140 may be stored within the storage. When storage 106 is full, BIOS 102 and EC 104 may perform any suitable operations to prevent data loss during full SPI ROM erase scenarios. In this situation, BIOS 102 may utilize an EC runtime NVMe access method to transfer the telemetry events into NVMe boot partition 150. The transfer of telemetry data 140 to ESP 150 may preserve the critical telemetry data during full SPI Flash wipe operations, which may be routinely performed during a NP-NV system recovery.

In certain examples, an EC telemetry data passthrough mechanism may be used to merge the SBIOS payloads fetched via MBOX I/O payloads into the NVMe ESP region 150. The EC telemetry data passthrough mechanism may preserve telemetry data 140. Additionally, the EC telemetry data passthrough mechanism may be used to offload other BIOS non-volatile data stored in SPI flash 106. In an example, EC 104 may use security module 132 to store telemetry data 140 in an encrypted format to prevent malicious use of the data stored in ESP partition 150. The storage of encrypted format from security module 132, may be utilized by BIOS 102 to store other data in ESP 150 via EC sideband channel. In an example, telemetry data 140 may be encrypted in any suitable format including, but not limited to, AES256 encrypted format.

In an example, EC 104 may perform one or more suitable operations to transfer telemetry data 140 from storage 106 to storage 108 prior to a full erase of data within storage 106. For example, EC service 130 may monitor a current capacity of storage 106 via a SPI bus. When storage is almost full, such as 80-90% capacity, EC service 130 may determine that a full SPI NVRAM erase may occur. In an example, EC service 130 may monitor the SPI bus for erase commands. In response to detection of a SPI NVRAM erase command, EC service 130 may determine that a full SPI NVRAM erase may occur. In response to the determination that a full SPI NVRAM erase may occur, EC 104 and BIOS 102 may interrupt the SPI NVRAM erase of storage 106 and backup telemetry data 140 within ESP 150 of storage 108. In certain examples, telemetry data 140 may be backed up in storage 108 by an EC callback operation. In an example, telemetry data 140 may also be backed up within a cloud server, such as cloud server 208 of FIG. 2.

During the EC callback operation, EC 104 may retrieve telemetry data 140 from storage 106 via any suitable manner. For example, BIOS 102 may read telemetry data 140 from storage 106, convert the telemetry data into MBOX packets for transmission to EC 104. In certain examples, an individual associated with information handling system 100 may be prompted via a graphical user interface (GUI) that telemetry 140 is going to be erased. The individual may also be provided, via the GUI, an option to select whether to proceed with generating a backup of telemetry data 140 before erasing the data in storage 106. In response to the individual selecting to generate the backup, BIOS 102 and EC 104 may perform one or more operations to backup telemetry data 140 in ESP 150 of storage 108 as will be described below. In an example, information handling system 100 may include a BIOS setup option to manage the ESP backup policy, such as a backup enable/disable checkbox.

In an example, EC service 130 may register with BIOS 102, storage 106, or any other component within information handling system to receive SPI read/write notifications. When firmware or a programming device within information handling system 100 triggers a SPI NVRAM erase of storage 106, a notification may be provided to EC service 130 via a SPI bus. In response to the notification, EC 104 may receive telemetry data 140 via BIOS 102 or from a read command to storage 106. After receiving telemetry data, EC 104 may store telemetry data 140 in the boot partition 150 of storage 150. In an example, telemetry data 140 may be provided to ESP 150 via I2C sideband communication channel. In response to telemetry data 140 being written to ESP 150 of storage 108, EC service 130 may release the SPI erase command to be performed and the erase operation of storage 106 may be completed.

During a subsequent boot operation, BIOS 102 may access ESP 150 to retrieve telemetry data 150. For example, simple filesystem 120 may determine that telemetry data 140 is stored in ESP 150. Based on telemetry data 140 being located in ESP 150, BIOS 102 retrieve telemetry data 140 via simple filesystem 120 over a PCI bus. BIOS 102 may write the retrieve telemetry data 140 into storage 106.

Figure 2:
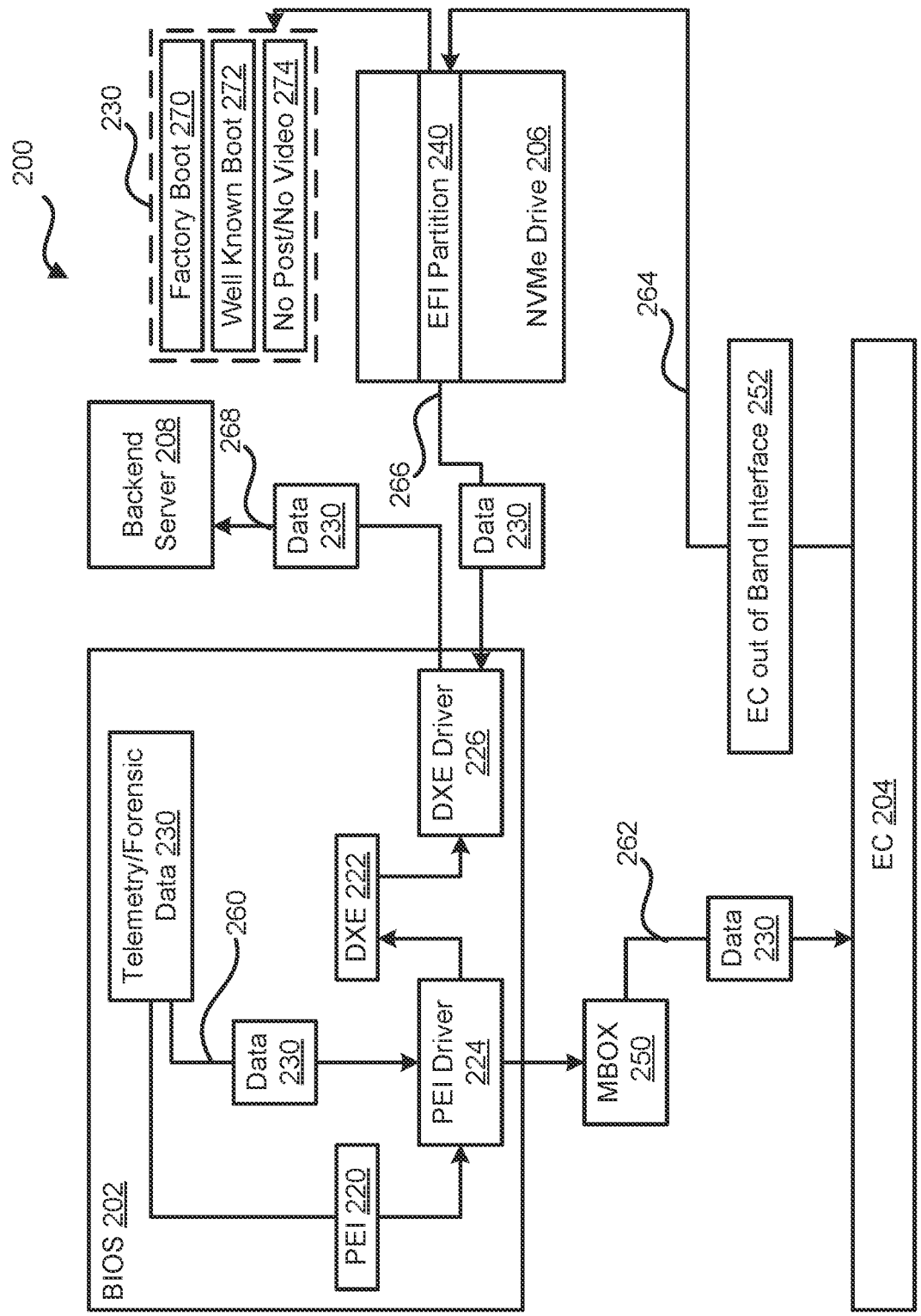
FIG. 2 is a block diagram of a portion of an information handling system according to at least one embodiment of the present disclosure.

FIG. 2 illustrates a portion of an information handling system 200 according to at least one embodiment of the present disclosure. Information handling system 200 may be substantially similar to information handling system 100 of FIG. 1. Information handling system 200 includes a BIOS 202, an EC 204, a NVMe drive 206, and a backend server 208. BIOS 202 may execute boot operations, such as unified extensible firmware interface (UEFI) operations. In an example, the UEFI boot flow may be divided into a sequence of phases, including a pre-EFI initialization (PEI) phase, followed by a driver execution environment (DXE) phase, a boot device selection (BDS) phase, and a run time (RT) phase. The UEFI boot sequence can include additional phases, however the present disclosure relates to operations generally performed during the PEI and DXE phases, so discussion of the other phases is omitted for clarity.

BIOS 202 includes a PEI phase 220 and a DXE phase 222. In an example, a PEI driver 224 may be executed during PEI phase 220, and a DXE driver 226 may be executed during DXE phase 222 as will be described below. BIOS 202 may also include telemetry data 230. NVMe drive 206 includes multiple partitions including, but not limited to, EFI partition 240. In an example, NVMe drive 206 may be substantially similar to storage 108 of FIG. 1 and EFI partition 240 may be substantially similar to ESP 150 of FIG. 1.

During execution of PEI phase 220, BIOS 202 may hang with a NP/VN failure. When there is a system hang with VP/NV, PEI driver 224 may read telemetry data 230 or hand-off block (HOB) data at operation 260. PEI driver 224 may be any suitable driver to be executed during PEI phase 220. In response to telemetry data 230 being read, PEI driver 224 may issue a MBOX command 250 to push the telemetry data to the ESP partition 240 of NVMe drive 206 through EC 204. At operation 262, PEI driver 224 may provide telemetry data 230 to EC 204 via MBOX 250.

In response to receiving telemetry data 230, EC 204 may utilize EC out-of-band interface 252 to provide the telemetry data to EFI partition 240 of NVMe drive 206 at operation 264. In certain examples, out-of-band interface 252 may be utilized as a side-band channel of information handling system 200. In an example, telemetry data 230 may include any suitable data associated with boot operations of information handling system 200. For example, telemetry data 230 may include, but is not limited to, factory boot data 270, well known boot data 272, and NP/NV data 274.

In certain examples, EC 104 may set a flag in BIOS 202, and the flag may indicate that an early boot critical telemetry event log has been saved to EFI partition 240 of NVMe drive 206. Based on the flag being set and when BIOS 202 boots to DXE phase 222, DXE driver 226 may read telemetry data 230 from EFI partition 240 at operation 268. At operation 268, DXE driver 226 may connect the UEFI network stack to backend server 208 and provide telemetry data 230 to the backend server. Backend server 208 may perform one or more operations on telemetry data 230 to determine any remediation that may be needed for information handling system 100. In an example, backend server 208 may utilize telemetry data 230 for root cause analysis (RCA) of the PEI events.

Figure 3:
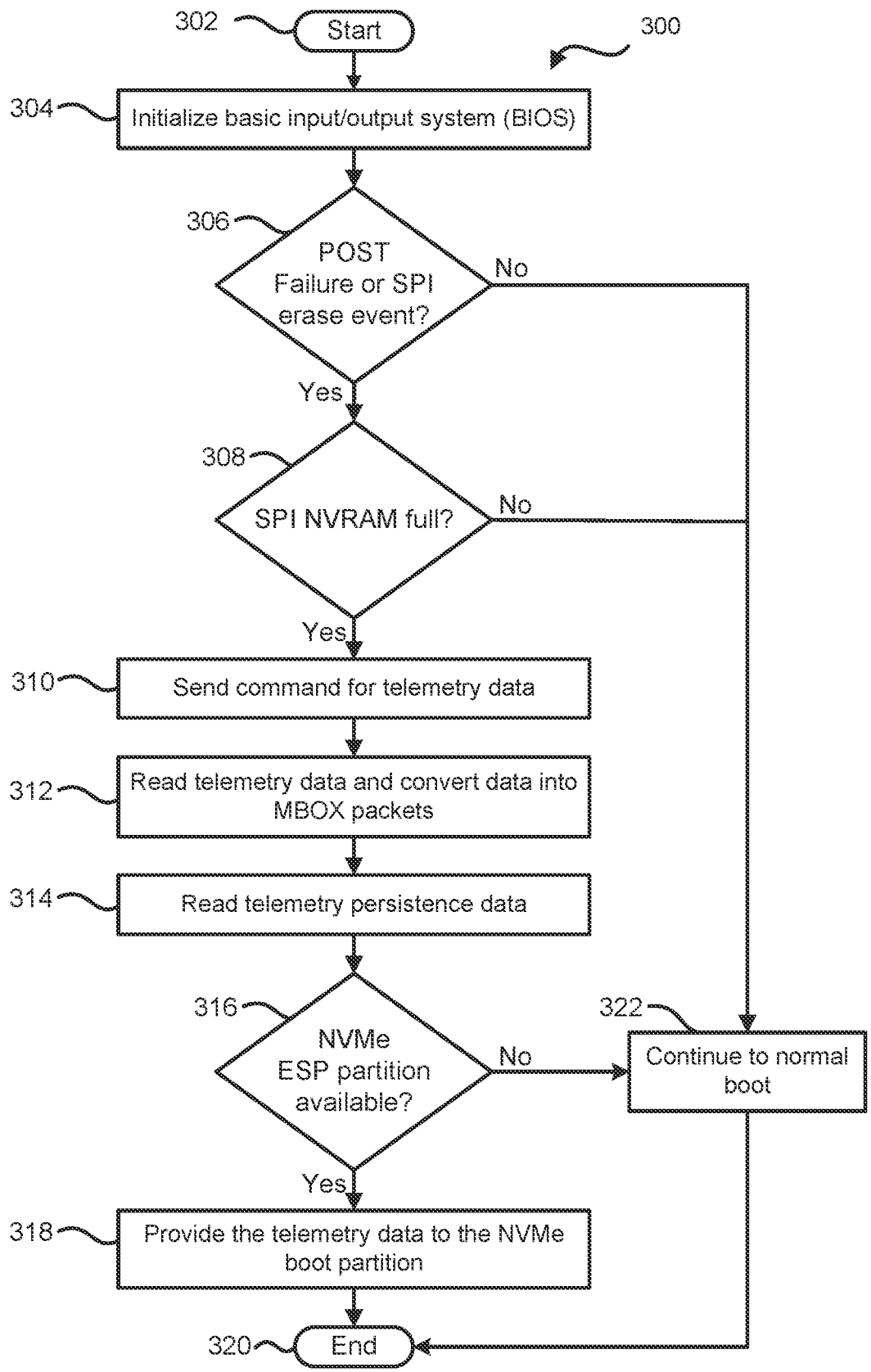
FIG. 3 is a flow diagram of a method for saving system telemetry data during system failures according to at least one embodiment of the present disclosure.

FIG. 3 is a flow diagram of a method 300 for saving system forensic data during system failures according to at least one embodiment of the present disclosure, starting at block 302. In an example, method 300 may be performed by any suitable component including, but not limited to, BIOS 102 and EC 104 of FIG. 1. It will be readily appreciated that not every method step set forth in this flow diagram is always necessary, and that certain steps of the methods may be combined, performed simultaneously, in a different order, or perhaps omitted, without varying from the scope of the disclosure.

At block 304, a BIOS of an information handling system is initialized. At block 306, a determination is made whether a power-on self-test (POST) failure or a SPI erase event has been detected. If neither a POST failure nor a SPI erase event has been detected, the flow continues as described below at block 322. If a POST failure or a SPI erase event has not been detected, the flow continues at block 306. If a POST failure or a SPI erase event has been detected, a determination is made whether a SPI NVRAM is full at block 308. In an example, the SPI NVRAM may be considered full if the storage capacity is 80-90% utilized.

If the SPI NVRAM is not full, the flow continues at block 322. If the SPI NVRAM is full, a command for telemetry data may be sent at block 310. In an example, an EC may provide or send the command requesting the telemetry data to PEI driver executed in a BIOS of the information handling system. The EC may transmit the command via a MBOX transmission between the EC and the BIOS. At block 312, the telemetry data is from a memory device and converted into MBOX packets. In an example, the PEI driver may read the telemetry data from a SPI NVRAM.

At block 314, the packetized telemetry data is read. In an example, the EC may read the telemetry data via MBOX communication between the EC and the BIOS. At block 316, a determination is made whether an ESP partition of a NVMe drive is available. If the ESP partition is available, the telemetry data is provided to the ESP partition of the NVMe drive at block 318 and the flow ends at block 320. In an example, the EC may provide the telemetry data to the NVMe drive via an I2C sideband or out-of-band communication channel. If the ESP partition is not available, a normal boot operation is continued at block 322 and the flow ends at block 320.

Figure 4:
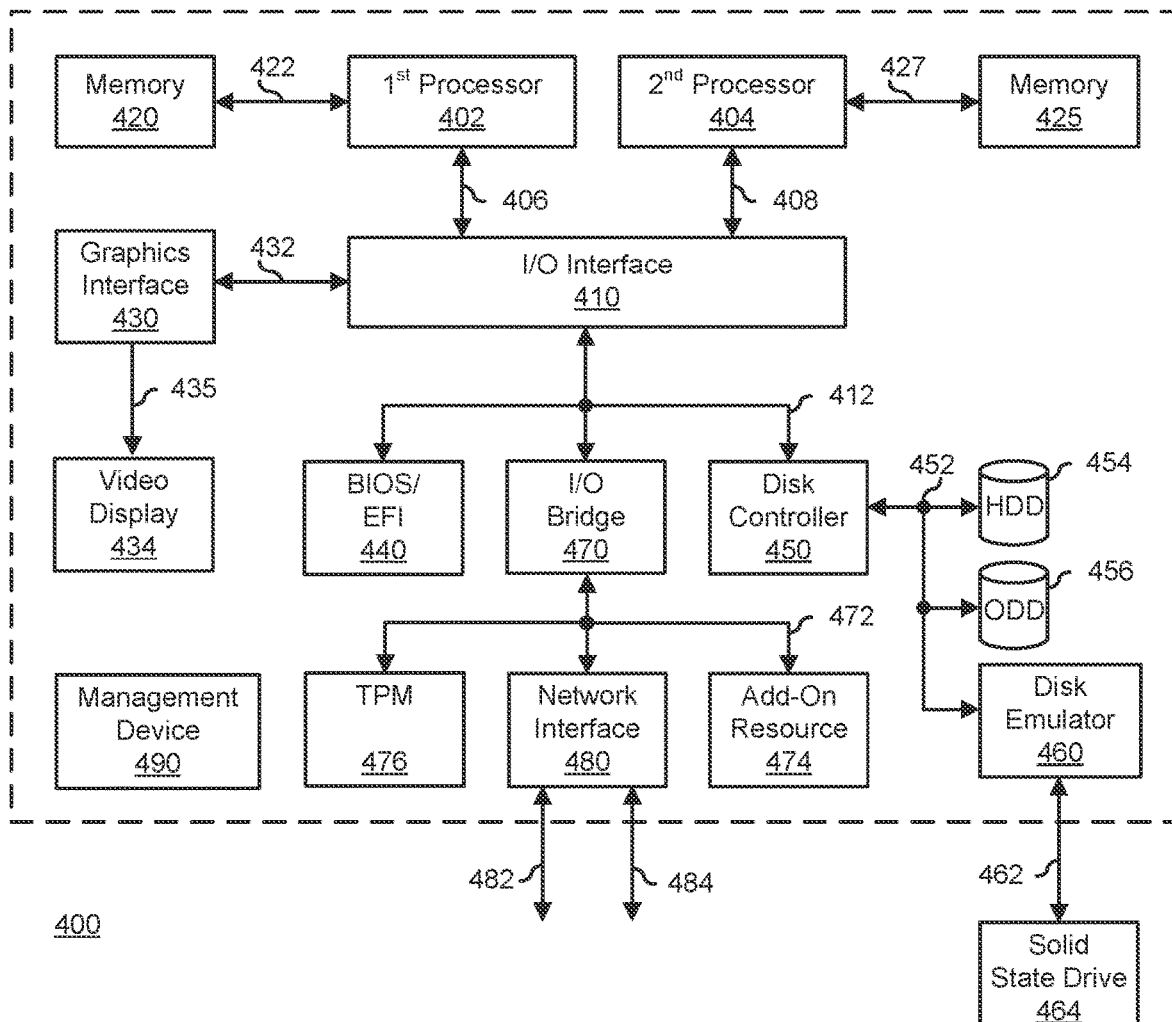
FIG. 4 is a block diagram of a general information handling system according to an embodiment of the present disclosure.

FIG. 4 shows a generalized embodiment of an information handling system 400 according to an embodiment of the present disclosure. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432 and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit (I2C) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 4394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412 or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, which operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400.

Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed, or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An information handling system comprising:
a first storage configured to store telemetry data associated with the information handling system;
a second storage including a boot partition;
a basic input/output system (BIOS) in communication with the first storage, the BIOS to store the telemetry data in the first storage; and
an embedded controller in communication with the BIOS and with the second storage, the embedded controller to:
receive the telemetry data stored in the first storage from the BIOS; and
provide the telemetry data to the boot partition of the second storage, wherein the embedded controller provides the telemetry data to the boot partition over an out-of-band communication channel.

2. The information handling system of claim 1, wherein the telemetry data is provided to the embedded controller via a pre-extensible firmware interface (pre-EFI) initialization driver executed in the BIOS.

3. The information handling system of claim 1, wherein prior to the reception of the telemetry data, the embedded controller further to:
receive a notification of a command to erase the first storage; and
pause an erase operation associated with the command to erase.

4. The information handling system of claim 3, wherein in response to the telemetry data being provided to the boot partition, the embedded controller further to: release the erase operation of the first storage.

5. The information handling system of claim 1, wherein the embedded controller further to: encrypt the telemetry data prior to the telemetry data being provided to the boot partition.

6. The information handling system of claim 1, wherein a pre-extensible firmware interface (pre-EFI) initialization driver of the BIOS reads the telemetry data from the first storage based on a telemetry retrieval command from the embedded controller.

7. The information handling system of claim 6, wherein the telemetry retrieval command is provided based on a power-on self-test failure of the BIOS.

8. The information handling system of claim 6, wherein the telemetry retrieval command is provided based on a detection that the first storage is full.

9. A method comprising:
storing, by a basic input/output system (BIOS) of an information handling system, telemetry data in a first storage, wherein the telemetry data is associated with the information handling system;
receiving, by an embedded controller of the information handling system, the telemetry data stored in the first storage from the BIOS; and
providing, by the embedded controller, the telemetry data to a boot partition of a second storage, wherein the embedded controller provides the telemetry data to the boot partition over an out-of-band communication channel.

10. The method of claim 9, wherein the telemetry data is provided to the embedded controller via a pre-extensible firmware interface (pre-EFI) initialization driver executed in the BIOS.

11. The method of claim 9, wherein prior to the receiving of the telemetry data, the method further comprises:
receiving a notification of a command to erase the first storage; and pausing an erase operation associated with the command to erase.

12. The method of claim 11, wherein in response to the telemetry data being provided to the boot partition, the method further comprises: releasing the erase operation of the first storage.

13. The method of claim 9, wherein the method further comprises encrypting the telemetry data prior to the telemetry data being provided to the boot partition.

14. The method of claim 9, wherein a pre-extensible firmware interface (pre-EFI) initialization driver of the BIOS reads the telemetry data from the first storage based on a telemetry retrieval command from the embedded controller.

15. The method of claim 14, wherein the telemetry retrieval command is provided based on a power-on self-test failure of the BIOS.

16. The method of claim 14, wherein the telemetry retrieval command is provided based on a detection that the first storage is full.

17. A method comprising:
   storing, by a basic input/output system (BIOS) of an information handling system, telemetry data in a first storage, wherein the telemetry data is associated with the information handling system;
   receiving a notification of a command to erase the first storage;
   pausing an erase operation associated with the command to erase;
   providing, by an embedded controller of the information handling system, a telemetry retrieval command to the BIOS;
   receiving, by the embedded controller, the telemetry data stored in the first storage from the BIOS; and
   providing, by the embedded controller, the telemetry data to a boot partition of a second storage, wherein the embedded controller provides the telemetry data to the boot partition over an out-of-band communication channel.

18. The method of claim 17, wherein the method further comprises: encrypting the telemetry data prior to the telemetry data being provided to the boot partition.

19. The method of claim 17, wherein the telemetry retrieval command is provided based on a power-on self-test failure of the BIOS.

20. The method of claim 17, wherein the telemetry retrieval command is provided based on a detection that the first storage is full.

* * * * *